US009883572B2

(12) United States Patent
Huang

(10) Patent No.: US 9,883,572 B2
(45) Date of Patent: Jan. 30, 2018

(54) ELECTRONIC DEVICE

(71) Applicant: ASUSTeK COMPUTER INC., Taipei (TW)

(72) Inventor: Hsin-Wu Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/587,408

(22) Filed: May 5, 2017

(65) Prior Publication Data
US 2017/0332464 A1 Nov. 16, 2017

Related U.S. Application Data

(60) Provisional application No. 62/333,857, filed on May 10, 2016.

(30) Foreign Application Priority Data

Mar. 14, 2017 (TW) .............. 106203555 U

(51) Int. Cl.
H05B 41/00 (2006.01)
H05B 41/16 (2006.01)
H05B 41/34 (2006.01)
H05B 41/38 (2006.01)

(52) U.S. Cl.
CPC ............. H05B 41/16 (2013.01); H05B 41/34 (2013.01); H05B 41/38 (2013.01)

(58) Field of Classification Search
CPC ............. H02M 3/157; H02M 7/53806; H02M 1/0845; H02M 2001/008; H02M 2001/0012; H02M 3/33507; H02M 2001/007; H02M 7/53871; H02M 1/36; H02M 2001/0058; H02M 3/156; H02M 3/1588; H02M 3/3376

See application file for complete search history.

(56) References Cited

U.S. PATENT DOCUMENTS 7,746,671 B2 * 6/2010 Radecker .......... H02M 3/33507
323/244

FOREIGN PATENT DOCUMENTS

CN 101137264 A 3/2008
CN 101527121 A 9/2009
CN 101868108 A 10/2010

* cited by examiner

Primary Examiner — Monica C King
(74) Attorney, Agent, or Firm — CKC & Partners Co., Ltd.

(57) ABSTRACT

An electronic device adapted for adjusting a light effect of a CCFL is provided. The electronic device is electronically connected to the CCFL. The electronic device comprises a PWM controller configured to receive at least a digital signal and to output a specific-frequency reference signal according to the digital signal, a driver electronically connected to the PWM controller and configured to output a first voltage signal according to the specific-frequency reference signal, and a transformer electronically connected to the driver and the CCFL. The transformer amplifies the first voltage signal to generate a second voltage signal and sends the second voltage signal to the CCFL. A light effect is generated by the CCFL according to the second voltage signal.

10 Claims, 2 Drawing Sheets

ELECTRONIC DEVICE

CROSS-REFERENCE TO RELATED APPLICATION

This application claims the priority benefit of U.S. provisional application Ser. No. 62/333,857, filed on May 10, 2016 and Taiwan application serial No. 106203555, filed on Mar. 14, 2017. The entirety of the above-mentioned patent applications are hereby incorporated by references herein and made a part of specification.

BACKGROUND OF THE INVENTION

Field of the Invention
The disclosure relates to an electronic device.
Description of the Related Art
Conventionally, cold cathode fluorescent lamps (CCFL) are mainly used as backlight modules which applied widely in navigational systems, digital cameras and LCD TVs to provide a stable and non-flashing light source.

BRIEF SUMMARY OF THE INVENTION

According to an aspect of the disclosure, an electronic device electronically connected to the CCFL and adapted for adjusting a light effect of a CCFL is provided. The electronic device comprises: a pulse width modulation (PWM) controller configured to receive at least a digital signal and to output a specific-frequency reference signal according to the digital signal; a driver electronically connected to the PWM controller and configured to output a first voltage signal according to the specific-frequency reference signal; and a transformer electronically connected to the driver and the CCFL, the transformer amplifies the first voltage signal to generate a second voltage signal and sends the second voltage signal to the CCFL, and a light effect is generated by the CCFL according to the second voltage signal.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Multiple embodiments are described below accompanying with the figures. Practical details will also be described hereinafter. However, it should be understand that some practical details are not used for limiting the disclosure. Additionally, for concise illustration, some commonly-used components or structures in the art are simplified in the figures.

In an embodiment, an electronic device adapted for adjusting a light effect of a cold cathode fluorescent lamp (CCFL) is provided. The electronic device is electronically connected to the CCFL. In an embodiment, the electronic device is an inverter.

Figure 1:
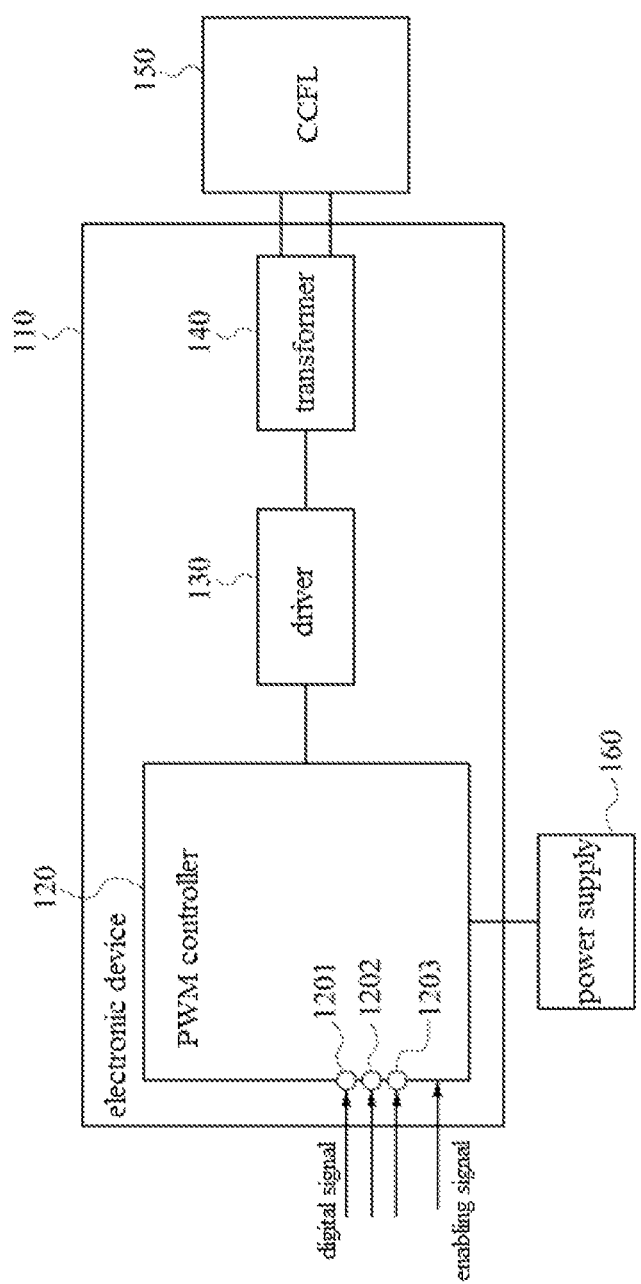
FIG. 1 is a functional block diagram showing an electronic device in an embodiment.

FIG. 1 is a functional block diagram showing an electronic device in an embodiment. The electronic device 110 includes a pulse width modulation (PWM) controller 120, a driver 130 and a transformer 140. The driver 130 is electronically connected to the PWM controller 120. The transformer 140 is electronically connected to the driver 130 and the CCFL 150.

In the embodiment, the PWM controller 120 is connected to a power supply 160. The power supply 160 provides a direct current (DC) voltage to the PWM controller 120. The PWM controller 120 is enabled via an enabling signal. In an embodiment, a user triggers a switch to generate the enabling signal. The PWM controller 120 is enabled via the enabling signal. The PWM controller 120 is connected to general purpose input/output (GPIO) ports 1201, 1202 and 1203. The PWM controller 120 is configured to modulate the direct current voltage received from the power supply 160 to a specific-frequency reference signal according to digital signals received from the GPIO ports 1201, 1202 and 1203. The PWM controller 120 outputs the specific-frequency reference signal to the driver 130. That is, the DC voltage signals received from the power supply 160 is converted into an alternating current (AC) voltage signal via the PWM controller 120. The DC voltage is modulated into the specific-frequency reference signal with different frequencies according to the different digital signals. In the embodiment, the number of the GPIO ports (1201, 1202 and 1203) is three. In an embodiment, the number of the GPIO ports is changed according to the requirements, which is not limited herein.

Then, the driver 130 outputs a first voltage signal according to the specific-frequency reference signal from the PWM controller. The first voltage signal is amplified into a second voltage signal by the transformer 140. The second voltage signal is input to the CCFL 150. Then, the CCFL 150 is enabled to discharge to generate a light effect according to the second voltage signal. In the embodiment, the second voltage signal is an AC voltage signal for driving the CCFL 150 to discharge. The light effects generated by the CCFL 150 are different based on the different oscillation frequencies of the second voltage signals. That is, different first voltage signals are output by the driver 130 according to different specific-frequency reference signals. Accordingly, different second voltage signals are output by the transformer 140 according the different first voltage signals. Then, different light effects are generated by the CCFL 150.

Figure 2:
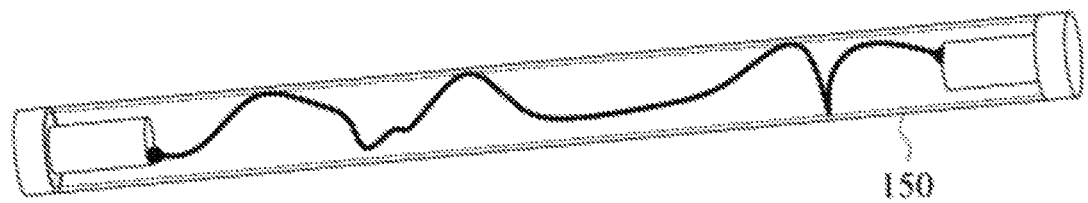
FIG. 2 is a schematic diagram showing a light effect of a CCFL when an oscillation frequency is at a first frequency range in an embodiment.
Figure 3:
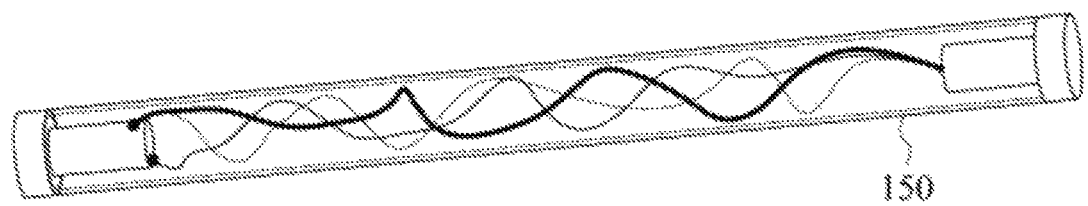
FIG. 3 is a schematic diagram showing a light effect of a CCFL when an oscillation frequency is at a second frequency range in an embodiment.
Figure 4:
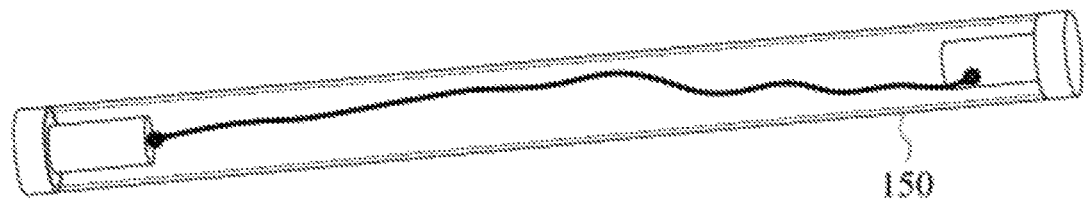
FIG. 4 is a schematic diagram showing a light effect of a CCFL when an oscillation frequency is at a third frequency range in an embodiment.

In the embodiment, when the oscillation frequency of the second voltage signal is in a first frequency range (that is, the oscillation frequency is between 10 Hz and 20 Hz), the light effect of the CCFL 150 is a flashing lightning-shape lighting as shown in FIG. 2. When the oscillation frequency of the second voltage signal is in a second frequency range (that is, the oscillation frequency is between 90 Hz and 300 Hz), the light effect of the CCFL 150 is a non-flashing lightning-shape lighting as shown in FIG. 3. When the oscillation frequency of the second voltage signal is in a third frequency range (that is, the oscillation frequency is between 10000 Hz and 25000 Hz), the light effect of the CCFL 150 is a static curve-line lighting or a static straight-line lighting shown in FIG. 4.

In the embodiment, when the oscillation frequency of the second voltage signal is gradually increased in a first transitional frequency range (that is, the oscillation frequency is increased gradually from 20 Hz to 90 Hz), the light effect generated by the CCFL 150 is changed gradually from the flashing lightning-shape lighting to the non-flashing lightning-shape lighting. When the oscillation frequency of the second voltage signal is increased gradually in a second transitional frequency range (that is, the oscillation frequency is increased gradually from 300 Hz to 10000 Hz), the light effect of the CCFL 150 is changed gradually from the non-flashing lightning-shape lighting to the static curve-line lighting or the static straight-line lighting.

In the embodiments, the electronic device provides the AC voltage signals with different oscillation frequencies to drive the CCFL to generate different light effects (including different light patterns). In such a way, the application of the CCFL is expanded to provide diverse light effects.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic device, adapted for adjusting a light effect of a cold cathode fluorescent lamps (CCFL), the electronic device is electronically connected to the CCFL, the electronic device comprising:
    a pulse width modulation (PWM) controller configured to receive at least a digital signal and to output a specific-frequency reference signal according to the digital signal;
    a driver electronically connected to the PWM controller and configured to output a first voltage signal according to the specific-frequency reference signal; and
    a transformer electronically connected to the driver and the CCFL, the transformer amplifies the first voltage signal to generate a second voltage signal and sends the second voltage signal to the CCFL, and a light effect is generated by the CCFL according to the second voltage signal.

2. The electronic device according to claim 1, wherein the electronic device further includes a power supply connected to the PWM controller, and the PWM controller is configured to modulate a direct current voltage received from the power supply into the specific-frequency reference signal according to the digital signal.

3. The electronic device according to claim 1, wherein the electronic device further includes at least a general purpose input/output (GPIO) port connected to the PWM controller, and the PWM controller receives the digital signal via the GPIO port.

4. The electronic device according to claim 1, wherein the PWM controller is enabled via an enabling signal.

5. The electronic device according to claim 1, wherein the second voltage signal is an alternating current (AC) voltage signal for driving the CCFL to discharge, the light effects of the CCFL are different based on the second voltage signals with different oscillation frequencies.

6. The electronic device according to claim 5, wherein when the oscillation frequency of the second voltage signal is in a first frequency range, the light effect of the CCFL is a flashing lightning-shape lighting.

7. The electronic device according to claim 5, wherein when the oscillation frequency of the second voltage signal is in a second frequency range, the light effect of the CCFL is a non-flashing lightning-shape lighting.

8. The electronic device according to claim 5, wherein when the oscillation frequency of the second voltage signal is in a third frequency range, the light effect of the CCFL is a static curve-line lighting or a static straight-line lighting.

9. The electronic device according to claim 5, wherein when the oscillation frequency of the second voltage signal is increased gradually in a first transitional frequency range, the light effect of the CCFL is gradually changed from a flashing lightning-shape lighting to a non-flashing lightning-shape lighting.

10. The electronic device according to claim 5, wherein when the oscillation frequency of the second voltage signal is increased gradually in a second transitional frequency range, the light effect of the CCFL is gradually changed from a non-flashing lightning-shape lighting to a static curve-line lighting or a static straight-line lighting.

* * * * *